M. S. SCHWARTZ.
CUSHION WHEEL.
APPLICATION FILED APR. 23, 1918.
1,293,558.
Patented Feb. 4, 1919.
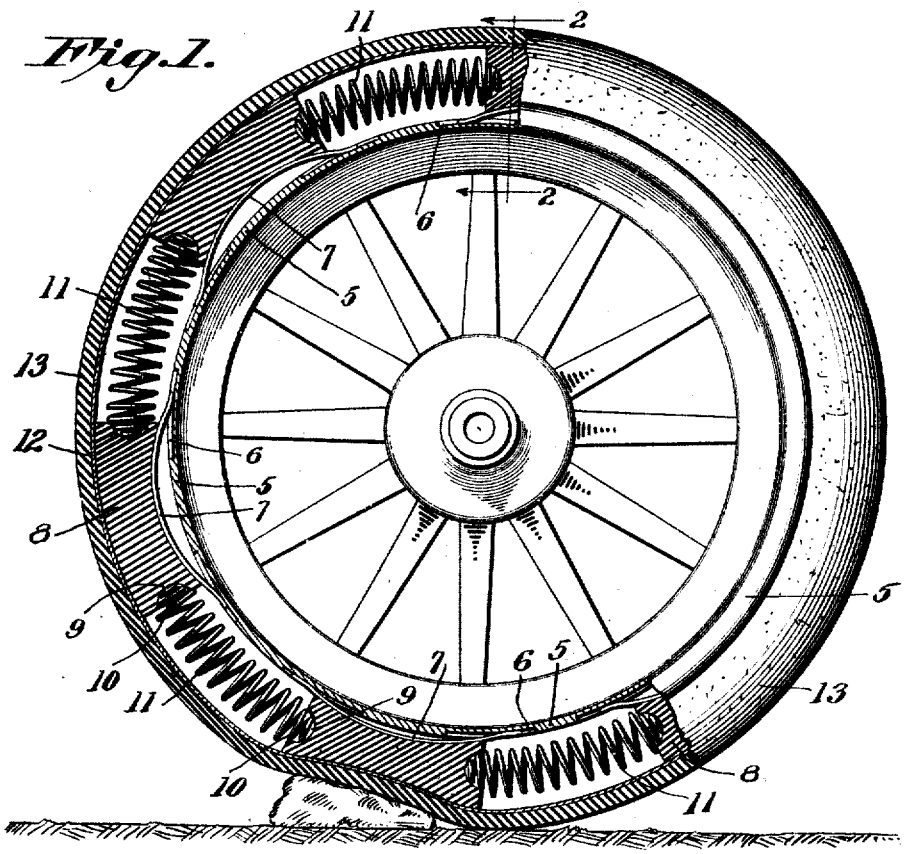
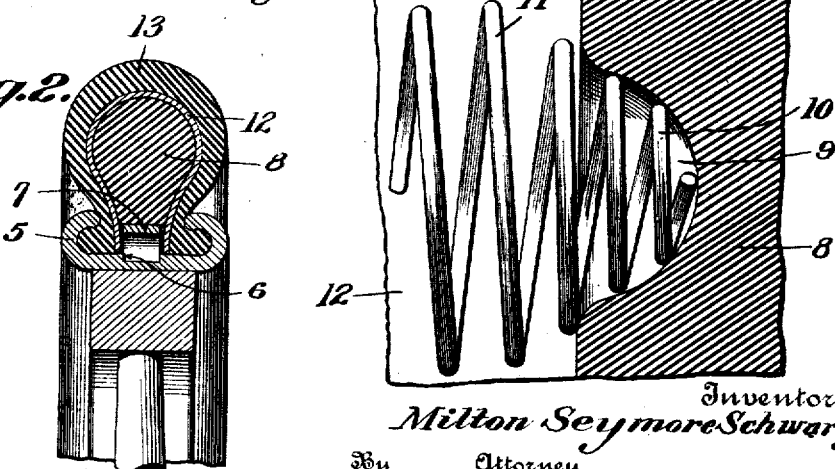
Inventor
Milton Seymore Schwartz
By Attorney
James H. Griffin

UNITED STATES PATENT OFFICE.

MILTON SEYMORE SCHWARTZ, OF BROOKLYN, NEW YORK.

CUSHION-WHEEL.

1,293,558.  Specification of Letters Patent.  Patented Feb. 4, 1919.

Application filed April 23, 1918. Serial No. 230,200.

*To all whom it may concern:*

Be it known that I, MILTON SEYMORE SCHWARTZ, a citizen of the United States, residing in the city of New York, borough of Brooklyn, county of Kings, and State of New York, have invented a certain new and useful Cushion-Wheel, of which the following is a specification.

This invention is a cushion wheel, and the object of the invention is a wheel of the class described, which is simple in construction, economical to manufacture, resilient and otherwise efficient in operation, and possessing pronounced durability.

Speaking generally, the invention, from a structural standpoint, embodies substantially, the customary wheel, so far as concerns the axle, felly and spokes, but arranged circumferentially on the outer face of the tire rim are a series of separated leaf springs which form backings for a corresponding number of solid, preferably resilient members, which are positioned in spaced relation, the spaces between said members being occupied by coiled springs, the ends of which have abutting engagement with the ends of the solid members, the structure thus specified being incased within any suitable shoe.

Features of the invention, other than those adverted to, will appear from the hereinafter detailed description, taken in conjunction with the accompanying drawing and appended claims.

In the accompanying drawing I have illustrated the preferred practical embodiment of the invention, though this specific form is typical and not exclusive of the different forms in which the invention may be given expression.

Referring to the drawings, Figure 1 shows the improved wheel, partly in section and partly in elevation;

Fig. 2 is a fragmentary, sectional view on line 2—2 of Fig. 1; and

Fig. 3 is a detail showing the end relation of the solid members and the coiled springs.

In the drawings, 5 is a rim, of the clencher type, provided on its outer face with a series of spaced grooves or pockets 6, for receiving and guiding the ends of leaf spring 7, preferably loosely mounted. The pockets 6 are of such length and so positioned as to provide for the extension of springs 7 in a circumferential direction when said springs are compressed.

Arranged in juxtaposition to springs 7, in spaced relation to each other, are a series of solid members 8, preferably of rubber, or rubber and cork, each of which is preferably dished or cupped at its ends, as shown at 9, for receiving and housing the ends 10 of coiled springs 11, whereby said springs are supported in the spaces between the solid members. The springs 11 are thus preferably floatingly supported; i. e., they, preferably, have no fixed connection with any of their associated parts. Members 8 might, of course, be made cellular, to increase their yielding action, or might be more or less cored.

Exteriorly of the elements of the structure described is a covering 12, preferably of canvas or other suitable material, the whole structure being then incased in any suitable shoe 13.

The principle of operation of the structure will be readily understood from the foregoing description, but it may be briefly described as follows. Upon the wheel meeting an obstruction, e. g., the stone or cobble 14, the solid, resilient members 8 are compressed, the force of which compression is received radially by the yielding, extensible, loosely mounted, leaf springs 7, and circumferentially by the floating coiled springs 11, which are readily compressible. It will be noted that the coiled springs are so supported as to avoid engagement with, and consequent wear on, the shoe; that there are comparatively few parts to the structure, none of which are subjected to undue wear, and that in view of the absence of attaching connections, such as bolts, rivets, links, etc., the parts of the structure can be readily assembled. Moreover, in case of breakage of one or more of the elements, replacement can be readily made.

It will be understood that slight changes and modifications may be made in the specific structure described, such as the substitution of equivalents, without departing from the spirit or substance of the invention, the scope of which is commensurate with the appended claims.

Having thus fully described the invention, what I claim as new and desire to secure by Letters Patent, is:

1. In a cushion wheel, a rim, a plurality of loosely mounted, spaced leaf springs positioned circumferentially and exteriorly of the rim, a plurality of solid, spaced members in juxtaposition to said springs, coiled springs positioned between the solid members, and a suitable shoe coöperating with the rim to incase said springs and solid members.

2. In a cushion wheel, a rim, a plurality of loosely mounted, spaced leaf springs positioned circumferentially and exteriorly of the rim, a plurality of spaced solid members, having their ends cupped engaging the outer face of said leaf springs, coiled springs positioned between the solid members and having their ends seated in the cups of the solid members and a shoe coöperating with the rim.

3. In a cushion wheel, a rim, a plurality of loosely mounted springs arranged circumferentially thereof, a plurality of spaced members exteriorly of said springs, floating coil springs positioned in the spaces between said spaced members, a casing for said springs and members and a shoe exterior of said casing and coöperating with the rim.

4. In a cushion wheel, a rim provided with pockets, leaf springs having their ends positioned within said pockets, spaced resilient members having their inner faces engaging the outer faces of said springs, coiled springs circumferentially arranged in the spaces between said resilient members and a shoe coöperating with the rim.

5. In a cushion wheel, a rim provided with pockets, leaf springs having their ends positioned within said pockets, spaced resilient members having their inner faces engaging the outer faces of said springs, depressions in the ends of said resilient members, coiled springs having their ends positioned in the resilient members whereby said springs are floatingly mounted on the resilient members and a shoe coöperating with the rim.

6. In a cushion wheel, a rim provided with pockets, leaf springs having their ends positioned within said pockets, spaced resilient members having their inner faces engaging the outer faces of said springs, coiled springs circumferentially arranged in the spaces between said resilient members, a fabric covering said springs and resilient members and a shoe coöperating with said rim.

7. In a cushion wheel, a rim, a plurality of circumferentially arranged springs associated therewith for receiving radial pressures, a plurality of spaced members coöperating with said springs, coiled springs circumferentially arranged, floatingly supported in the spaces between said members for receiving circumferential pressures, and a shoe coöperating with said rim.

In testimony whereof I have signed my name to this specification.

MILTON SEYMORE SCHWARTZ.

Copies of this patent may be obtained for five cents each, by addressing the "Commissioner of Patents, Washington, D. C."